United States Patent [19]
Pray et al.

[11] Patent Number: 5,275,432
[45] Date of Patent: Jan. 4, 1994

[54] AIR BAG DEPLOYMENT DOOR WITH SNAP FIT

[75] Inventors: John H. Pray, Shelby Township, Macomb County; David E. Thomas, North Branch, both of Mich.

[73] Assignee: AlliedSignal Inc., Morristown, N.J.

[21] Appl. No.: 968,904

[22] Filed: Oct. 30, 1992

[51] Int. Cl.⁵ .............................................. B60R 21/16
[52] U.S. Cl. .............................. 280/728 A; 280/728 B
[58] Field of Search ........................................ 280/728

[56] References Cited

U.S. PATENT DOCUMENTS

| | | | |
|---|---|---|---|
| 3,539,200 | 11/1970 | Chute | 280/731 |
| 4,842,299 | 6/1989 | Okamura | 280/732 |
| 4,893,833 | 1/1990 | DiSalvo et al. | 280/728 B |
| 5,060,972 | 10/1991 | Satoh | 280/728 B |
| 5,066,037 | 11/1991 | Castrigno | 280/728 B |
| 5,096,221 | 3/1992 | Combs et al. | 280/728 B |
| 5,167,427 | 12/1992 | Baba | 280/728 A |

*Primary Examiner*—Karin L. Tyson
*Attorney, Agent, or Firm*—Markell Seitzman

[57] ABSTRACT

An apparatus for an air bag safety restraint system comprising a deployment door (70), a chute (30) adapted to fit within an opening (24) within a component (20) of a vehicle and receive a deployment door (70). The chute (30) includes a first side (32a) and second side (32d). The second side (32d) includes a wall portion (34d) a snap-fit mechanism (125). The deployment door (70) including a substrate (70) including a cover member (74), a hinge member (78) formed along one side of the cover member (74), a flange (124) extending from the cover member (74) from a second side thereof and a tear seam (122) between the second side and the flange. The tear seam (122) being stressed and broken upon inflation of the air bag (69) permitting the cover member (74) to rotate about the hinge member permitting the air bag (69) to deploy, the flange (124) including receptacles 134a-c for engaging the snap-fit mechanism (125).

6 Claims, 3 Drawing Sheets

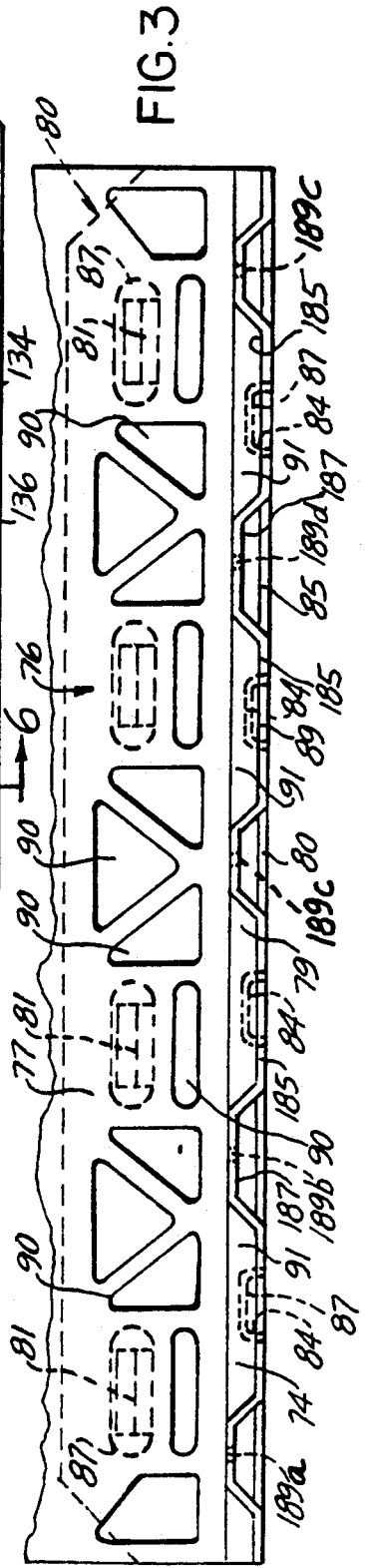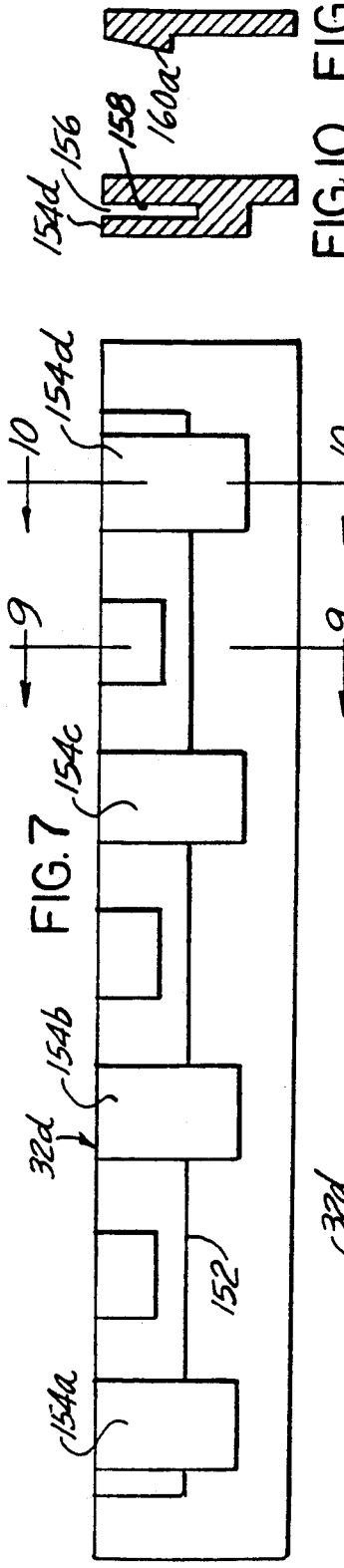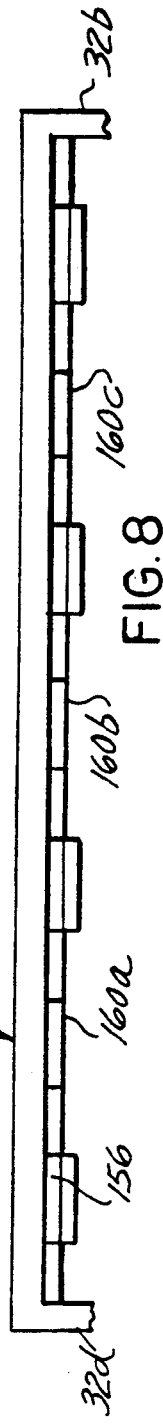

AIR BAG DEPLOYMENT DOOR WITH SNAP FIT

BACKGROUND AND SUMMARY OF THE INVENTION

The present invention relates to inflatable safety restraint systems for vehicles and more specifically to an air bag deployment door.

U.S. Pat. No. 4,893,833 illustrates a deployment door for an air bag safety restraint system comprising a hinge located on one side of the deployment door and a tear seam located on the other. This door can be secured in opening of an instrument panel by bolting the hinge side and tear seam side to cooperating portions of the instrument panel. Alternatively, the door can be bolted to a reaction can member which is often part of an air bag safety restraint system.

Rivet attachment in the prior art results in an increased stress load distribution in the hinge section. The indicated design is difficult to manufacture and to install because of the fragile nature of the tear seam design.

It is an object of the present invention to provide a deployment door that is easily attached to a instrument panel or other similar structure within the passenger compartment of a vehicle.

Accordingly, the invention comprises an apparatus for an air bag safety restraint system comprising a deployment door, a chute adapted to fit within an opening within a component of a vehicle and receive a deployment door, the chute, includes a first side and a second side. The second side includes a wall portion and first means defining a snap-fit mechanism. The deployment door comprises a substrate including a cover member, a hinge member formed along one side of the cover member, a bracket member extending away from the hinge member and is adapted to be mounted to the first side of the chute. A flange extends from the cover member from a second side thereof and includes a tear seam between the second side and the flange. The tear seam being stressed and broken upon inflation of the air bag, permitting the cover member to rotate about the hinge member, permitting the air bag to deploy. The flange includes second means for engaging the snap-fit mechanism.

Many other objects and purposes of the invention will be clear from the following detailed description of the drawings.

BRIEF DESCRIPTION OF THE DRAWINGS

In the drawings:

FIG. 3 illustrates a plan view of part of a deployment door.

FIG. 4 illustrates a rotated view of the door.

FIG. 5 shows a flange member.

FIGS. 7 and 8 shows various views of a snap fit feature.

FIGS. 9 and 10 show cross-sectional views of part of the snap-fit feature.

FIG. 11 is an enlarged view of portions of FIG. 2.

DETAILED DESCRIPTION OF THE DRAWINGS

Figure 1:
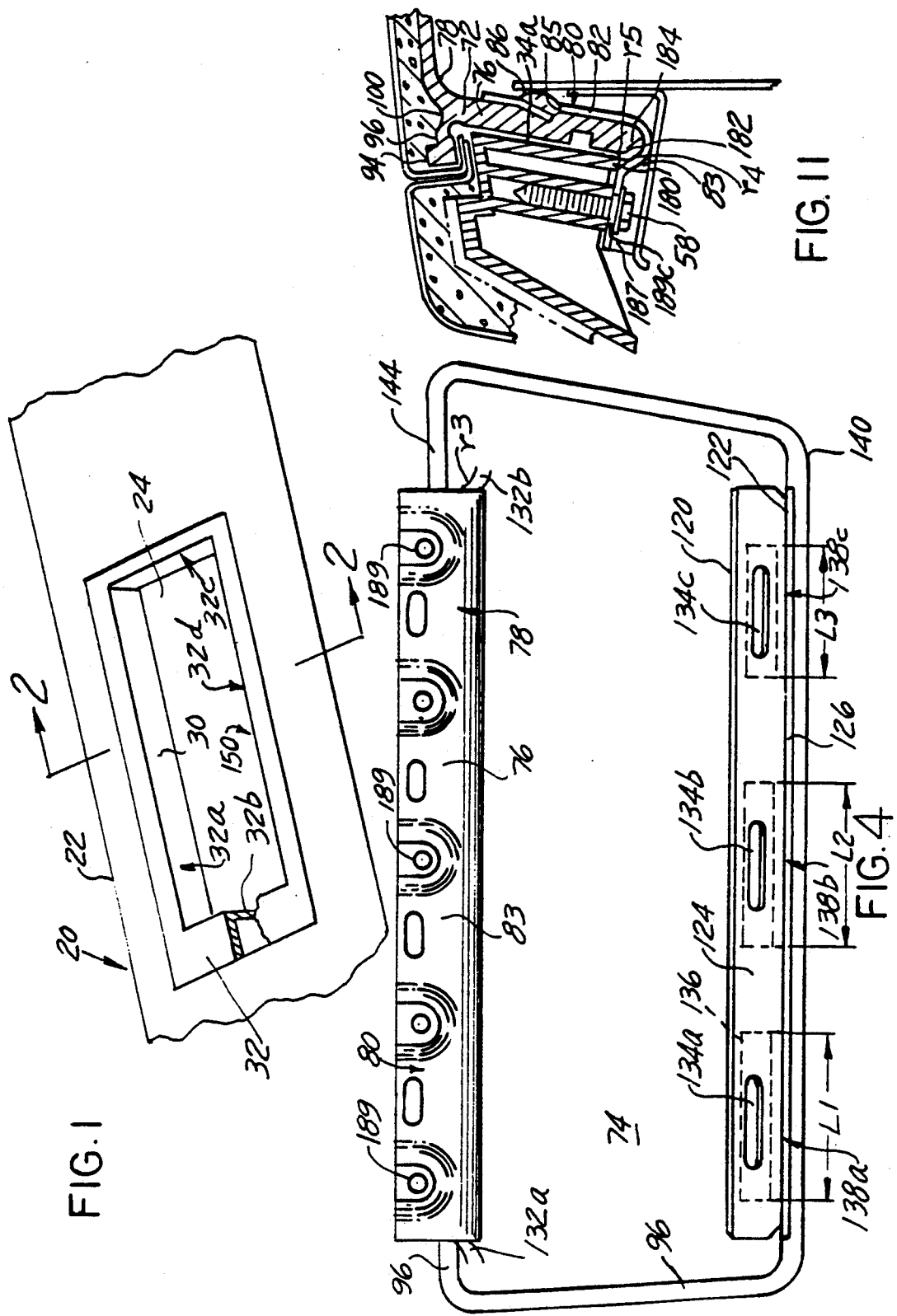
FIG. 1 illustrates a projected view of the right portion of a typical instrument panel.

FIG. 1 illustrates a projected view of a typical instrument panel 20. The side 22 of the instrument panel 20 would typically be oriented toward the vehicle windshield (not shown). Instrument panels 20 such as illustrated above are manufactured of a foam and skin construction. Situated within the instrument panel 20 on the passenger side of the vehicle is an opening 24. A picture frame-like device called chute 30 is fitted to the opening and is supported by the instrument panel. As can be seen from FIG. 1, the chute 30 is rectangularly shaped and includes a plurality of sides 32a, 32b, 32c and 32d defining inward facing walls 34a–d. An air bag deployment door 70 is to be mounted to the instrument panel 20 and sized to fit within the recess 32.

Figure 2:
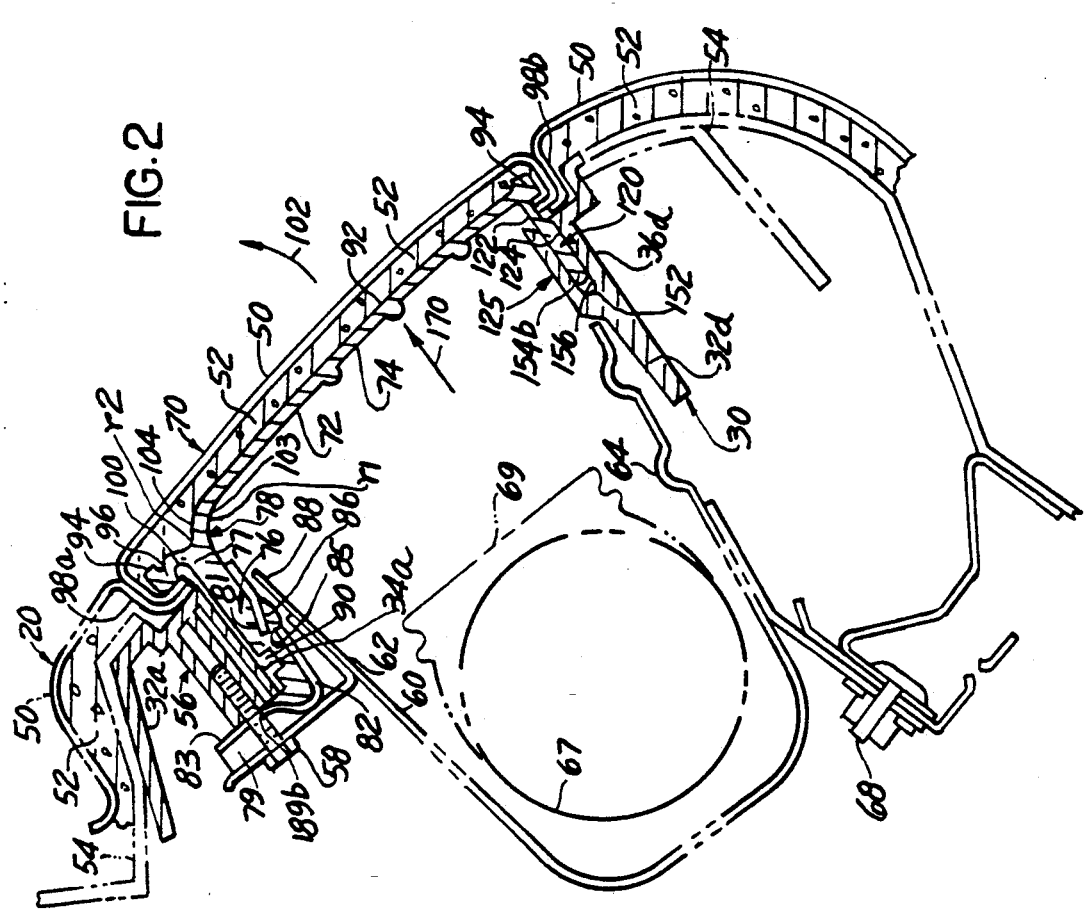
FIG. 2 illustrates a cross-sectional view through the instrument panel showing the major elements of the present invention.

Reference is made to FIG. 2 which illustrates a cross-sectional view of the construction of a typical instrument panel 20 and also shows the major features of the present invention. The instrument panel 20 comprises an outer skin 50 applied to a foam layer 52. The foam layer is supported by a substrate 54 which may be plastic. The chute 30 which in the preferred embodiment of the invention is also plastic can be vibration welded to mating portions of the instrument panel substrate 54.

FIG. 2 illustrates a cross-section of two of the sides 32a and 32d of the chute. As can be seen, each of the sides 32a and 32d is of an open channel construction to enhance its strength. Sides 32b and 32c (not shown) have a similar construction. Wall 32d is fabricated with a mating snap fit feature 125 described below. The side 32a is fabricated with an increased wall thickness portion 56 to receive a plurality of mounting fasteners 58 (only one of which is shown) which facilitate attachment of the deployment door 70 and a reaction can 60. One side 62 of the reaction can 60, via bracket 61, is secured by the fasteners to the underside of portion 56 of the side 32a while the other side 64 of the reaction can 60 is supported relative to a reinforcement member 66, positioned below the instrument panel 20, by a plurality of fasteners 68 (one of which is shown). As is known in the art, the reaction can houses a gas generator 67 and air bag 69.

In order to match the fit and finish of the instrument panel, the deployment door 70 is also made of a foam 52 and skin 50 construction. The foam and skin are applied to a substrate 72 [preferably thermoplastic] (TPO). It should be appreciated that in some applications the foam and skin can be eliminated and only the substrate 72, appropriately textured, used. The substrate 72 comprises a central door portion 74 and an L-shaped integral bracket member 76 having an upward extruding wall portion 77 and outward extending portion 79. The transition between the bracket member 76 and the central portion 74 defines a unitary hinge 78. The bracket member 76 is preferably injection molded to an L-shaped reinforcement metal bracket 80. The upper face 92 of the substrate 72 is fabricated with a peripheral or circumferential shoulder 94 to increase the strength of the substrate 72. The bracket 80 includes an upward extending wall 82 and an extending ledge 83. The wall 82 includes a tab 81 forming a slot 85 through which the substrate 72 material flows during the molding process to form a plurality of buttons 86 securing the metal bracket 80 to the integral plastic bracket 76. The plastic buttons 86 protruding from the extending wall 82 provide an anti-rattle feature prohibiting the end 88 of the reaction can 60 from impacting the metal bracket 80. Ledge 83 includes a plurality of upwardly bent strips 84 (see FIG. 3) defining openings 87 to similarly provide a mechanical bond securing the substrate material to the metal bracket with substrate material 89 filling the volume below the strips 84.

FIG. 3 is an isolated rear plan view of the door 70 showing the exposed left side of the bracket 76 and part of the reinforcement bracket 80. The extending ledge 83 of the metal bracket 80 further includes a plurality of flats 185 and recesses 187. Each recess 187 includes a mounting hole 189. The strips 84 extend upward from the flats 185. As can also be seen from FIG. 3, the extending portion 79 of the integral bracket 76 is segmented with segments 91 laying on the flats 185 of the metal bracket 80. It has been found that this type of construction reduces the stress imparted to the metal bracket by the substrate during air bag inflation. The integral bracket portion 76 of the door 70 may be fabricated with a number of cut-outs 90 or reduced thickness portions, also shown in FIGS. 2 and 3, primarily to reduce the overall weight of the door 70.

As mentioned above, the door 70 is fabricated with the integral hinge 78. As can also be seen from FIG. 2, the substrate includes a lip 96 which extends beyond the hinge 78 to essentially fill the space between the opposing walls 98a and 98b of the instrument panel. The lip 96 spans the length of the door 70 and is positioned behind the hinge 78 i.e. the desired axis of rotation of the door 70. The lip 96 is fabricated with an undercut 100 (see FIG. 2) to increase its flexibility so that when the door rotates to its open position as designated by arrow 102 the lip 96 will not act as a fulcrum impeding the rotation of the door 70. In addition, to more positively define the hinge point of this integrally formed hinge 78, it has been found desirable to form the inner wall 103 and outer wall 104 of the substrate 72 of different radii r1 (9.2±0.25 mm) and r2 (15±0.25 mm), respectively.

Figure 6:
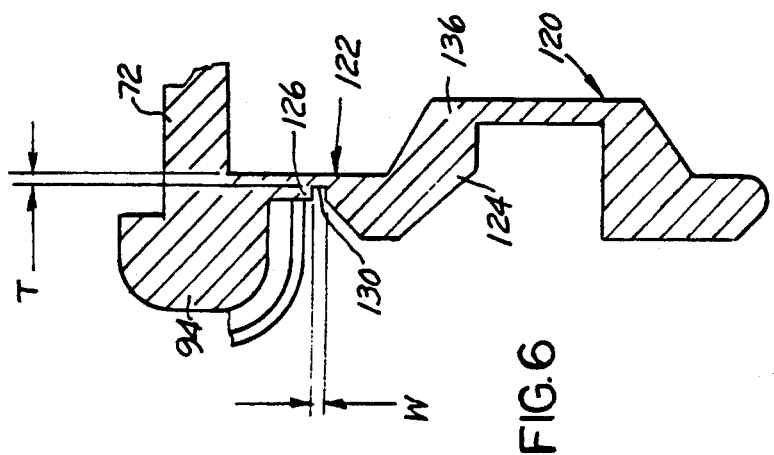
FIG. 6 is a cross-sectional view through section 6—6 of FIG. 5.

Situated on a side of the substrate 72, opposite the bracket 76 is another walled end 120. This element 120 comprises a tear seam 122 and a downwardly extending flange member 124 adapted to snap fit within the snap fit portion 125 of the wall 32d of the chute 30. FIGS. 4, 5 and 6 more specifically illustrate the construction of the tear seam 122. FIG. 6 is an enlarged view showing the upper portion of the substrate 72, the shoulder 94, and flange 124. Extending down from the substrate 72 is a narrow ledge 126 running the length of the flange 124. Positioned below the ledge 126 is the flange 124. Situated between these members 124 and 126 is the tear seam 122. The tear seam 122 is of a generally square (U-shaped notched portion 130) cross section having a thickness T of approximately 0.4 mm and a width W of approximately 0.6 mm. Reference is again made to FIG. 4 which more clearly illustrates the relationship between the metal bracket 80 at the hinge end, the central portion 74 of the substrate 72 as well as the relation between the flange 124 and the substrate 74. As can be seen from this Figure the hinge 78 does not extend across the entire length of the substrate nor does the flange 124. In addition, the ends 132a,b of the hinge 78 are constructed with a radius r3 of about 15 mm. This construction has been found to improve engegy absorption as the the hinge 78 is exposed to very forceful deployment of the air bag. As can be seen from FIGS. 4 and 5, the flange 124 includes a plurality of receptacles, including depressions or alternatively openings 134a, b and c and reinforced sections 136 of the flange 124 about each opening 134 on the rear face of the flange 124. Also visible in FIG. 4 is the tear seam 122. As can be appreciated, the tear seam 122 can extend across the entire length of the flange 124. However, it has been found beneficial to fabricate the tear seam in sections such as 138a, 138b and 138c which are also shown in FIG. 5.

As can also be seen from FIG. 4, the dimensions of the deployment door 70 are asymmetric. That is the width across edges 140 to 144 is smaller on the left hand side of the door than on the right. As such, the right hand side of the door will be slightly stiffer than the left hand portion of the door. This slight difference in stiffness might tend to cause the door to twist slightly during air bag inflation and open unevenly in response to the forces generated by the inflating air bag. To compensate for this effect, the length of each of the tear seams 138a, b and c are preferably fabricated of differing lengths such as L1, L2 and L3 with section 138a greater than 138b which is greater than 138c.

FIG. 5 more clearly shows the tear seam 122 with sections 138a-c and open slots 137a,b therebetween. In addition, the ends of the tear seam 122 are fabricated with a sharp notch 130 to facilitate the initiation of tearing. This is especially useful if the substrate material is notch sensitive.

Reference is now made to FIGS. 7 and 8. FIG. 7 illustrates a plan view of the exposed wall 32d of the chute 30 as viewed in the direction of arrow 150 (see FIG. 1). The wall 32d is formed with an integrally extending ledge 152 a portion of which is also shown in FIG. 2. Extending outward and upward along the length of the ledge 152 are a plurality of fingers 154a-d. One of these fingers such as 154b is shown in FIG. 2. As can be seen, each of these fingers 154a-d is spaced (see space 156) from the rear wall 158 of the chute 30. Positioned between adjacent fingers 154a-d are a plurality of triangularly shaped protrusions or elements 160a-c which extend from the rear wall 158. This construction comprises the above mentioned snap action member 125. FIG. 9 illustrates a cross-sectional view through section 9—9 of FIG. 8 illustrating one of these triangular elements such as 160a and FIG. 10 illustrates a cross-sectional view through section 10—10 of FIG. 7 illustrating a cross-sectional view of one of the fingers such as 154d. FIG. 8 illustrates a top view of the wall 32d illustrating the relationship of the various fingers 154 and latching elements 160.

The installation of the door 70 to the instrument panel 20 is accomplished as follows. The door is fitted within the opening 24 of the instrument panel and the integral bracket 76 fitted below the reinforced portion 56 of the side 32a of the chute 30. Thereafter fasteners such as 58 are inserted within two of the five openings 189 such as 189b and 189d formed within the reinforcement bracket 80 securing the hinge end of the cover 70 to the instrument panel. At a later time during the assembly interval when the reaction can 60 is fitted to the instrument panel, additional fasteners 58 are installed within the remaining three openings such as 189a,c,e provided within the bracket 80 to more completely secure the bracket 80 and reaction can 60 to the chute 30. Thereafter the end 120 of the cover 70 is urged on to the side 32d of the chute. More specifically, and as mentioned above, the flange 124 is inserted within the space 156 provided between each of the fingers 154a-d and the rear wall 34d of the chute 30. As the member 120 is inserted, the flange 124 flexes slightly permitting it to bend around the snap elements 160a–d until the various openings or depressions 134a–c are snapped about and retained by each of the triangular snap elements 160a–c and fingers 154a–d.

Reference is briefly made to FIG. 2 and more specifically to the arrow 170 which illustrates the resultant of the forces generated by the inflating air bag. The resultant force, depending upon the type of air bag and gas generator used, can approach 58,000 pounds (257,984 N). The air bag initially stresses the substrate 72 causing each of the tear seam portions 138a–c to be stressed and then fracture permitting the cover 70 to rotate in the direction of arrow 102. As can be appreciated, the hinge portion 78 and the integral bracket 76 of the cover must absorb an extremely high loading and do so without fracturing. Fracturing is lessened by enhancing the energy absorption capacity of the hinge area with the structure described below. Reference is made to FIG. 11, which illustrates an enlarged and partial view of the hinge end of the cover 70. As can be seen, the inner wall 34a of side 32a of the chute 30 is positioned in close proximity to the substrate 72. The edge of the inner wall defines a corner 180 and the transition surface on the outer side of the bracket 76 defines a corner 182. The corners 180 and 182 are fabricated with different radii. As an example, it is preferable that if the radius of curvature r4 of the corner 180 is approximately 1 mm and the radius r5 of corner 182 should be 2 mm energy absorption is increased. As can be seen, the corner 180 is in close proximity to the bracket 76 as well as being fairly close to the application point of the mounting forces resulting from each of the fasteners 58. In addition, the corner 182 is slightly spaced from the corner 180. During the inflation of the air bag the portion of the substrate 184 to the left of corner 180 will be held relatively fast, with a relatively modest clamping force while the substrate proximate at the corner 182 will, in response to the tensile forces produced by the inflating bag, stretch and slide upwardly about the decreased radius corner 180 dissipating some of the air bag reaction force energy as it stretches, which in turn lessens the amount of force or energy which must be absorbed specifically across the hinge 78.

Many changes and modifications in the above described embodiment of the invention can, of course, be carried out without departing from the scope thereof. Accordingly, that scope is intended to be limited only by the scope of the appended claims.

We claim:

1. An apparatus for an air bag safety restraint system comprising a deployment door (70), a support member (30) adapted to receive a deployment door (70), the member (30), including a first side (32a) and second side (32d), the second side (32d) including a wall portion (34d) and first means (154; 160) defining a snap-fit mechanism (125);

the deployment door (70) comprising:

a substrate (70) including a cover member (74), a hinge member (78) formed along one side of the cover member (74), a first member (76,80) extending away from the hinge member (78) and adapted to be mounted to the first side (32a) of the support member (30), a flange (124) extending from the cover member (74) from a second side of the cover member thereof and a tear seam (122) between the second side of the cover member and the flange, the tear seam (130) being stressed and broken upon inflation of the air bag (69) permitting the cover member (74) to rotate about the hinge member permitting the air bag (69) to deploy, the flange (124) including second means (134a–c) to engage the snap-fit mechanism (125) wherein the snap-fit mechanism (125; 160) comprises a plurality of fingers (154a–d) extending upwardly and spaced (156) from the wall portion (34d) of the support member (30) and a plurality of protruding elements (160a–c) extending outwardly from the wall portion (34d) and wherein the second means (134a–c) comprises a plurality of receptacles (134) formed in the flange (124) to engage the protruding elements (160a–c) thereby securing the door (70) to the second side (34d) of the support member upon insertion of the flange (124) within the snap-fit mechanism.

2. The apparatus as defined in claim 1 wherein the tear seam (122) comprises a region of material (126) having a U-shaped notch (130), including two oppositely positioned sharp corners, formed therein between the flange (124) and second side of the cover member (74).

3. The apparatus as defined in claim 2 wherein the thickness of the material (126) is approximately 0.4 mm.

4. The apparatus as defined in claim 2 wherein the tear seam (122) comprises three distinct segments of dissimilar lengths extending across at least part of the second side of the cover member (70).

5. An apparatus for an air bag safety restraint system comprising a deployment door (70), a support member (30) adapted to receive a deployment door (70), the support member (30), including a first side (32a) and second side (32d), the second side (32d) including a wall portion (34d) and first means (154; 160) defining a snap-fit mechanism (125);

the deployment door (70) comprising:

a substrate (70) including a cover member (74), a hinge member (78) formed along one side of the cover member (74), a bracket member (76,80) extending away from the hinge member (78) and adapted to be mounted to the first side (32a) of the support member (30), a flange (124) extending from the cover member (74) from a second side of the cover member thereof and a tear seam (122) between the second side of the cover member and the flange, the tear seam (130) being stressed and broken upon inflation of the air bag (69) permitting the cover member (74) to rotate about the hinge member permitting the air bag (69) to deploy, the flange (124) including second means (134a–c) to engage the snap-fit mechanism (125); wherein the first member (75,80) includes a first extending part (76) and a metal reinforcement bracket (80) and wherein the cover member (74), hinge member (78) first extending part (76), flange (124) and tear seam (122) are of integral construction and fabricated of a thermoplastic material; wherein the first extending part (76) is generally L-shaped and includes a wall portion (77) extending downwardly from the cover member (74) and an extending portion (79) extending outwardly therefrom and wherein the reinforcement bracket (80) is generally L-shaped and positioned to an underside of the first extending part (76), such that portions (86) of the first extending part (76) extend through openings (84) in the reinforcement bracket (80) forming buttons (86), a transition surface (182) between the wall portion (77) and the extending portion (79), opposite the reinforcement bracket (80), having a radius of curvature (r5), the first extending part (76) engaging an undersurface of the first side (32a) of the member (30) wherein a lower edge (180) of the first side is curved with the radius of curvature r4 less than r5 thereby permitting the first bracket (76) to stretch and slide in response to forces imparted by the inflating air bag about the lower edge dissipating energy as it slides and stretches.

6. The apparatus as defined in claim 5 wherein the support member includes a chute fitted in an opening of an instrument panel including a reaction can (60) secured at one side (64) thereof to a structural member (66) within the vehicle under the door (70) and secured along a second side (62) to the chute (30) including a can bracket (61) adapted to fit against an extending portion (83) of the reinforcement bracket (80) and wherein an end (88) of the second side (62) of the reaction can (60) is positioned proximate the buttons (86) on the reinforcement bracket (80) such that the end (88) of the reaction can (60) is prevented from engaging the metal reinforcement bracket (80).

* * * * *